United States Patent [19]

Kobayashi

[11] Patent Number: 4,871,614
[45] Date of Patent: Oct. 3, 1989

[54] OPTO-MAGNETIC RECORDING MEDIUM HAVING THREE EXCHANGE-COUPLED MAGNETIC LAYERS

[75] Inventor: Tadashi Kobayashi, Yokohama, Japan

[73] Assignee: Canon Kabushiki Kaisha, Tokyo, Japan

[21] Appl. No.: 170,053

[22] Filed: Mar. 16, 1988

Related U.S. Application Data

[63] Continuation of Ser. No. 71,081, Jul. 8, 1987, abandoned.

[30] Foreign Application Priority Data

| Jul. 9, 1986 [JP] | Japan | 61-159716 |
| Jul. 9, 1986 [JP] | Japan | 61-159717 |
| Jul. 9, 1986 [JP] | Japan | 61-159719 |
| Jul. 9, 1986 [JP] | Japan | 61-159720 |
| Jul. 9, 1986 [JP] | Japan | 61-159721 |

[51] Int. Cl.⁴ .............................................. G11B 5/64
[52] U.S. Cl. .................................. 428/336; 365/122; 369/13; 428/611; 428/694; 428/900
[58] Field of Search ............... 428/694, 336, 900, 611; 365/122; 369/13

[56] References Cited

U.S. PATENT DOCUMENTS

| 4,556,291 | 12/1985 | Chen | 350/377 |
| 4,628,485 | 12/1986 | Tanaka et al. | 428/692 |
| 4,645,722 | 2/1987 | Katayama | 428/694 |
| 4,670,356 | 6/1987 | Sato et al. | 428/693 |

FOREIGN PATENT DOCUMENTS 153546 11/1981 Japan .

OTHER PUBLICATIONS

S. Tsunashima et al., *Thermomagnetic Writing on Multilayered Amorphous Rare-Earth Iron Films*, 5 Japan Applied Magnetics Scientific Journal 73 (1981).

T. Kobayashi, *Treatise on Amorphous Rare-Earth Transition-Metal Alloy Films, and Magnetic and Magnetooptic Effects of That Multilayered Films* (Nagoya Univ. 1985).

*Primary Examiner*—Paul J. Thibodeau
*Attorney, Agent, or Firm*—Fitzpatrick, Cella, Harper & Scinto

[57] ABSTRACT

An opto-magnetic recording medium includes: a substrate; a first magnetic layer formed on the substrate, the first magnetic layer having the following composition:

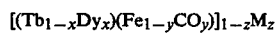

wherein $0 \leq x \leq 1$, $0 \leq y \leq 0.3$, and $0 \leq z \leq 0.2$, and M is one element selected from the group consisting of Cr and Al; and two second magnetic layers respectively formed on the two surfaces of the first magnetic layer, each of the second magnetic layers having a lower coercive force and a higher Curie temperature than those of the first magnetic layer, and being exchange-coupled to the first magnetic layer, and each of the magnetic layers having the following composition:

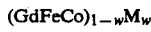

wherein $0 \leq w \leq 0.2$, and M is one element selected from the group consisting of Cr or Al.

6 Claims, 1 Drawing Sheet

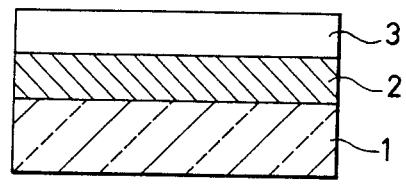
FIG. 1
PRIOR ART
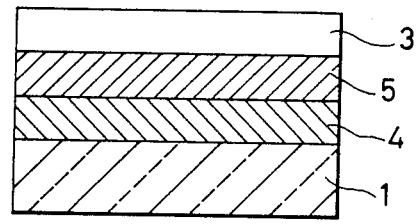
FIG. 2
PRIOR ART
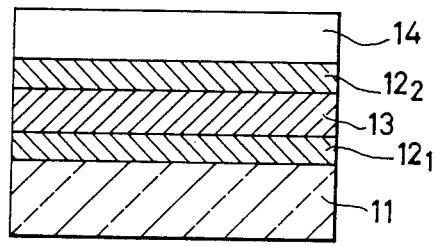
FIG. 3
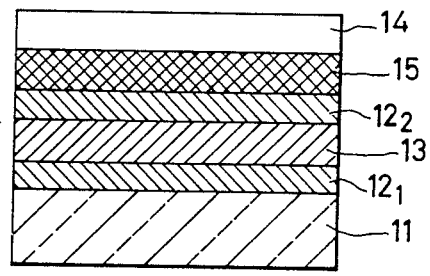
A10 FIG. 4

OPTO-MAGNETIC RECORDING MEDIUM HAVING THREE EXCHANGE-COUPLED MAGNETIC LAYERS

This application is a continuation of application Ser. No. 071,081, filed July 8, 1987, now abandoned.

BACKGROUND OF THE INVENTION

1. Field of the Invention

The present invention relates to an opto-magnetic recording medium used for an opto-magnetic memory and the like and, more specifically, to an opto-magnetic recording medium capable of thermo-magnetically recording data by radiation of light beams and reading out recorded data by using a magneto-optical effect.

2. Related Background Art

The conventional opto-magnetic recording medium has a structure as shown in FIG. 1. A substrate 1 is formed of glass, plastic, or the like. A magnetic film 2 serving as a recording layer and an $SiO_2$ protective layer 3 are formed on the substrate 1. As the magnetic film 2, a rare-earth iron amorphous alloy thin film is often used because of easy fabrication. When data is recorded on the recording medium, the magnetic film 2 is magnetized in advance in a predetermined direction, and a light beam intensity-modulated with a data signal is radiated thereon. A portion irradiated with the light beam is heated to near a Curie temperature, and its coercive force is decreased. Thus, an inverted magnetic domain is formed by an externally applied magnetic field. The inverted magnetic domain serves as a recording pit indicating data. The recorded data can be read out using the magneto-optical effect upon radiation of linearly polarized light beam.

In the opto-magnetic recording medium, in order to improve recording sensitivity, a magnetic film having a low Curie temperature must be used. On the other hand, in order to perform read access with a high S/N ratio, the higher magneto-optical effect is preferable. The level of the magneto-optical effect is represented by a Karr rotation angle indicating the degree of rotation of the radiated light beam polarization direction by a magnetic film. However, in general, if the rare-earth iron alloy has a larger Karr rotation angle, it tends to have a higher Curie temperature. Therefore, it is difficult to obtain a medium which can satisfy both the requirements of high recording sensitivity and a high reproduction S/N ratio.

In Japanese Patent Laid-Open Application No. 78652/1982 (U.S. counterpart application: U.S. Ser. No. 908,934 which is the continuation appln. of the CIP appln. Ser. No. 644,134 which is the CIP of U.S. Ser. No. 315,467), an optomagnetic recording medium having two magnetic layers is proposed, as shown in FIG. 2. Referring to FIG. 2, a second magnetic layer 4 of GdFe, GdFeCo, or the like, a first magnetic layer 5 of TbFe, DyFe, or the like and a protective layer 3 of a dielectric material are formed on a substrate 1. The second magnetic layer 4 has a lower coercive force and a higher Curie temperature than those of the first magnetic layer 5. These magnetic layers are exchange-coupled to each other. Recording is performed by heating these magnetic layers near the Curie temperature of the first magnetic layer by light beam radiation. Thus, an inverted magnetic domain is simultaneously formed in the two layers by an exchange-coupling force. In reproduction, a light beam is radiated onto the second magnetic layer 4 from the side of the substrate 1, thereby reading out data with a high S/N ratio. The double-layered magnetic layer structure is also described in "Magnetization Process of Exchange-Coupled Ferrimagnetic Double-Layered Films" Kobayashi et al., Japanese Journal of Applied Physics Vol. 20, No. 11, November, 1981, pp. 2089–2095 and "Thermomagnetic Writing on Exchange-Coupled Amorphous Rare-Earth Iron Double-Layer Films" Tsunashima et al., IEEE Transactions on Magnetics, Vol. MAG-17, No. 6, November 1981, pp. 2840–2842, in addition to the above-mentioned patent.

When an opto-magnetic recording medium is used in practical applications, an anti-corrosion property of the magnetic layer is important. However, in the medium with the double-layered structure, in particular, the first magnetic layer is easy to corrode, and long-term use cannot be ensured.

SUMMARY OF THE INVENTION

It is an object of the present invention to provide an opto-magnetic recording medium, which is free from the conventional drawbacks, has excellent recording and reproduction characteristics, and can be stably used over a long term.

In order to achieve the above object of the present invention, two second magnetic layers having a lower coercive force and a higher Curie temperature than those of a first magnetic layer are respectively formed on two sides of the first magnetic layer which mainly contributes to recording. The second magnetic layers are exchange-coupled to the first magnetic layer. The first and second magnetic layers respectively have the following compositions.

First Magnetic Layer:

$[(Tb_{1-x}Dy_x)(Fe_{1-y}Co_y)]_{1-z}M_z$

Second Magnetic Layer:

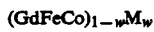

$(GdFeCo)_{1-w}M_w$ wherein $0 \leq x \leq 1$, $0 \leq y \leq 0.3$, $0 \leq z \leq 0.2$, and $0 \leq w \leq 0.2$, and M is one element selected from Cr and Al.

More specifically, according to the present invention, the first and second magnetic layers have the compositions capable of obtaining the best performance upon recording and reproduction, and the first magnetic layer is sandwiched between the second magnetic layers having a high anti-corrosion property.

BRIEF DESCRIPTION OF THE DRAWINGS

FIGS. 1 and 2 are respectively schematic sectional views showing structures of conventional opto-magnetic recording media; and FIGS. 3 and 4 are respectively schematic sectional views showing opto-magnetic recording media according to embodiments of the present invention

DETAILED DESCRIPTION OF THE PREFERRED EMBODIMENTS

FIG. 3 is a schematic sectional view showing the structure of an opto-magnetic recording medium according to an embodiment of the present invention. A transparent substrate 11 is formed of glass, plastic, or the like. A second magnetic layer $12_1$, a first magnetic layer 13, a second magnetic layer $12_2$, and a protective layer 14 are sequentially stacked on the substrate 11.

The first magnetic layer 13 essentially consists of an amorphous alloy thin film having the following composition, and has a relatively low Curie temperature and a high coercive force:

$$[(Tb_{1-x}Dy_x)(Fe_{1-y}Co_y)]_{1-z}M_z \quad (1)$$

wherein $0 \leq x \leq 1$, $0 \leq y \leq 0.3$, and $0 \leq Z \leq 0.2$, and M is one element selected from Cr and Al.

The second magnetic layers $12_1$ $12_2$ essentially consist of amorphous alloy thin films having the following composition, and have a lower coercive force and a higher Curie temperature than those of the first magnetic layer:

$$(GdFeCo)_{1-w}M_w \quad (2)$$

wherein $0 \leq w \leq 0.2$, and M is one element selected from Cr and Al.

The second magnetic layers $12_1$ and $12_2$ are exchange-coupled to the first magnetic layer 13. All the first and second magnetic layers provide a perpendicular magnetization anisotropy in the coupled state.

The protective layer 14 is adopted to protect the magnetic layers from corrosion, damage, and the like. As a material for the layer 14, a dielectric such as SiO, SiO$_2$, SiC, SiN, AlN, TiO$_2$, or ZnS is preferably used.

These magnetic layers and the protective layer are fabricated by depositing the above-mentioned materials on the substrate by vacuum deposition or sputtering. In this case, in order to exchange-couple the first and the second magnetic layers, a vacuum pressure in the fabrication apparatus is increased, and these magnetic layers can be continuously formed, so that a residual gas is not adsorbed on the interfaces between the magnetic layers.

When data is recorded using the opto-magnetic recording medium shown in FIG. 3, the first and second magnetic layers are magnetized in advance in a predetermined direction (upward or downward). These magnetic layers are scanned with a light beam which is modulated in accordance with the data from the side of the substrate 11 or the protective layer 14, while externally applying a bias magnetic field opposite to the magnetization direction of the magnetic layers. The temperature of a portion irradiated with the light beam is increased near the Curie temperature of the first magnetic layer 13, and the coercive force of the first magnetic layer is decreased. In this case, the magnetization direction of the radiated portions of both the first and second magnetic layers is inverted by an influence of the bias magnetic field. After the light beam has passed, an inverted magnetic domain corresponding to the data is formed as a recording pit. When the recorded data is to be reproduced, a linearly polarized light beam is radiated from the side of the substrate 11 or the protective layer 14. The light transmitted through or reflected by the medium, which is modulated in the polarization direction in accordance with the magnetization direction of the magnetic layers is detected, thereby reading out the data. At this time, the transmitting or reflected light is received by a photodetector through a polarization means such as an analyzer, so that a change in polarization direction can be intensity-modulated and detected.

When the data recording described above is performed using the medium of the present invention, the recording sensitivity largely depends on the Curie temperature Tc of the first magnetic layer. When first magnetic layers having various compositions within general formula (1) were prepared, the following relations were found among the Curie temperature Tc, an atomic composition ratio x of Dy, an atomic composition ratio y of Co, and an atomic composition ratio z of M:

$$Tc = 130(1-x) + 70x + 600Y - 500z (°C.) \quad (M=Cr) \quad (3)$$

$$Tc = 130(1-x) + 70x + 600Y - 300z (°C.) \quad (M=Al) \quad (4)$$

Therefore, the composition of the first magnetic layer can be determined in consideration of the Curie temperature Tc, so that an opto-magnetic recording medium with desired characteristics can be obtained. For example, if $x = 0.5$ and $y = 0.1$, $z = 0.12$ for Cr or $z = 0.2$ for Al can be used to obtain a Curie temperature of about 100° C. The optimal value of the Curie temperature changes in accordance with the power of a laser, the arrangement of an optical system, the structure of the medium, a rotation speed and diameter of a disk, and the like. In this case, s, y, and z can be appropriately selected to obtain the optimal Curie temperature. In general, the Curie temperature of the first magnetic layer preferably falls within the range of 90° to 120° C. taking the recording sensitivity and temperature stability into consideration. In the composition represented by formula (1), the atomic composition ratio of TbDy with respect to TbDyFeCo preferably falls within the range of 15 to 30 atomic %.

The composition of the second magnetic layers is also determined in accordance with formula (2). The composition of the second magnetic layers is preferably determined as follows.

$$[Gd_{1-p}(Fe_{1-q}Co_q)_p]_{1-w}M_w \quad (5)$$

wherein $70 \leq p \leq 85$, $0 \leq q \leq 50$, and $0 \leq w \leq 0.2$, and M is one element selected from Cr or Al.

The various film thicknesses of the first and second magnetic layers can be set depending on their compositions. In general, the film thickness of both the first and second magnetic films is preferably set to be 100 to 600 Å. The second magnetic layer on the beam radiation side preferably has a thickness of 200 Å or more in order to obtain a sufficient S/N ratio.

FIG. 4 is a schematic sectional view showing a structure according to another embodiment of the present invention. The same reference numerals in FIG. 4 denote the same parts as in FIG. 3, and a detailed description thereof will be omitted. The difference between the embodiments shown in FIGS. 3 and 4 is that a reflection layer 15 essentially consisting of a metal film of Al, Cu, Ag, or the like is formed on a second magnetic layer $12_2$. The reflection layer 15 reflects a light beam transmitted through the first and second magnetic layers from the side of the substrate 11, and causes the light to again transmit through the magnetic layers, thereby effectively utilizing light.

In the exchange-coupled magnetic film, a level of the exchange-coupling force of the magnetic layers principally influences the characteristics of the medium. The level of the exchange-coupling force varies depending on a value of the final vacuum pressure during fabrication. This is caused by the influence of a residual gas adsorbed on the interface during an interval between two adjacent fabricating operations of the magnetic film. This influence can be considerably improved by improving the anti-corrosion property. Therefore, the opto-magnetic memory medium of the present invention using the recording layer with an improved anti-corrosion property can improve not only a change over time in medium but also an exchange-coupling force.

The present invention will be described in detail by way of its examples.

EXAMPLE 1

Disk-like opto-magnetic memory media having a diameter of 130 mm according to the prior art technique and the present invention were respectively prepared by conventional sputtering, and an anti-corrosion test was conducted. The conventional medium adopted a double-layered structure consisting of two magnetic layers, i.e., a Gd-Fe-Co read layer (Gd:Fe:Co=18:62:20; film thickness, 500 Å) and a Tb-Fe recording layer (Tb:Fe=22:78; film thickness, 500 Å). The medium of this example adopted a three-layered structure consisting of three magnetic films, i.e., a Tb-Dy recording layer (Tb:Fe=22:78; film thickness, 400 Å) sandwiched between two Gd-Fe-Co read layers (Gd:Fe:Co=18:62:20; film thickness, 300 Å). In addition, a polycarbonate substrate was adopted.

In the anti-corrosion test using a 1N NaCl aqueous solution, considerable pin holes were visually observed on the conventional medium after it was dipped in the solution for 15 minutes. However, n pin holes could be visually observed on the medium of this example.

EXAMPLE 2

Disk-like opto-magnetic memory media having the following compositions and a diameter of 130 mm were prepared by conventional sputtering. A comparing test of the medium of this example and the conventional medium shown in Example 1 was conducted. The medium of this example adopted a three-layered structure consisting of three magnetic layers, i.e., a $(Tb_{1-x}Dy_x)$—Fe recording layer (x=0.5; film thickness, 400 Å) sandwiched between two Gd-Fe-Co read layers (Gd:Fe:Co=18:2:20; film thickness, 300 Å). In addition, a polycarbonate substrate was adopted.

At a rotation of 1800 rpm, the recording operation of the conventional medium required a laser power of 4.9 mW and a bias magnetic field of 200 Oe. However, the recording operation of the medium of this example only required a laser power of 4.2 mW and a bias magnetic field of 200 Oe. Thus, the recording characteristics could be improved.

In the anti-corrosion test using a 1N NaCl aqueous solution, considerable pin holes were visually observed on the conventional medium after it was dipped in the solution for 15 minutes. However, no pin holes could be visually observed on the medium of this example.

Although the precise measurement result of an exchange-coupling force could not be obtained since it included considerable errors, the exchange-coupling force of the medium of this example tended to be increased to 1.5 times that of the conventional medium.

EXAMPLE 3

Disk-like opto-magnetic memory media having the following compositions and a diameter of 130 mm were prepared by conventional sputtering. A comparing test of recording sensitivity of the medium of this example and the conventional medium shown in Example 1 was conducted. The medium of this example adopted a three-layered structure consisting of three magnetic layers, i.e., a Dy—$(Fe_{1-y}Co_y)$ recording layer (y=0.05; film thickness, 400 Å) sandwiched between two Gd-Fe-Co read layers (Gd:Fe:Co=18:62:20; film thickness, 300 Å). In addition, a polycarbonate substrate was adopted.

At a rotation of 1800 rpm, the recording operation of the conventional medium required a laser power of 4.9 mW and a bias magnetic field of 200 Oe. However, the recording operation of the medium of this example only required a laser power of 4.2 mW and a bias magnetic field of 200 Oe. Thus, the recording characteristics could be improved.

In the anti-corrosion test using a 1N NaCl aqueous solution, considerable pin holes were visually observed on the conventional medium after it was dipped in the solution for 15 minutes. However, no pin holes could be visually observed on the medium of this example.

In measurement of the exchange-coupling force, the force of the medium of this example tended to be increased to 1.5 times that of the conventional medium.

EXAMPLE 4

Disk-like opto-magnetic memory media having the following compositions and a diameter of 130 mm were prepared by conventional sputtering. A test of recording sensitivity was conducted. The medium of this example adopted a three-layered structure consisting of three magnetic layers, i.e., a $(Tb_{1-x}Dy_x)$—$(Fe_{1-y}Co_y)$ recording layer (x=0.8 and y=0.03; film thickness, 400 Å) sandwiched between two Gd-Fe-Co read layers (Gd:Fe:Co=18:62:20; film thickness, 300 Å).

At a rotation of 1800 rpm, the recording operation could be performed at a laser power of 4.3 mW and a bias magnetic field of 200 Oe. Thus, the recording characteristics could be improved.

In the anti-corrosion test using a 1N NaCl aqueous solution, no pin hole could be visually observed.

EXAMPLE 5

Disk-like opto-magnetic memory media having the following compositions and a diameter of 130 mm were prepared by conventional sputtering. A comparing test of recording sensitivity of the medium of this example and the conventional medium shown in Example 1 was conducted. The medium of this example adopted a three-layered structure consisting of three magnetic layers, i.e., a $(Tb-Fe)_{1-z}Cr_z$ recording layer (z=0.06; film thickness, 400 Å) sandwiched between two Gd-Fe-Co read layers (Gd:Fe:Co=18:62:20; film thickness, 300 Å). In addition, a polycarbonate substrate was adopted.

At a rotation of 1800 rpm, the recording operation of the conventional medium required a laser power of 4.9 mW and a bias magnetic field of 200 Oe. However, the recording operation of the medium of this example only required a laser power of 4.0 mW and a bias magnetic field of 200 Oe. Thus, the recording characteristics could be improved.

In the anti-corrosion test using a 1N NaCl aqueous solution, considerable pin holes were visually observed on the conventional medium after it was dipped in the solution for 15 minutes. However, no pin holes could be visually observed on the medium of this example.

In measurement of the exchange-coupling force, the force of the medium of this example tended to be increased to 1.3 times that of the conventional medium.

EXAMPLE 6

Disk-like opto-magnetic memory media having the following compositions and a diameter of 130 mm were prepared by conventional sputtering. A test of recording sensitivity was conducted. The medium of this example adopted a three-layered structure consisting of three magnetic layers, i.e., a $(Tb-Fe)_{1-z}Al_z$ recording layer (z=0.1; film thickness, 400 Å) sandwiched between two Gd-Fe-Co read layers (Gd:Fe:Co=18:62:20; film thickness, 300 Å).

At a rotation of 1800 rpm, the recording operation could be performed at a laser power of 4.3 mW and a bias magnetic field of 200 Oe. Thus, the recording characteristics could be improved.

In the anti-corrosion test using a 1N NaCl aqueous solution, no pin hole could be visually observed.

EXAMPLE 7

Disk-like opto-magnetic memory media having the following compositions and a diameter of 130 mm were prepared by conventional sputtering. A comparing test of recording sensitivity of the medium of this example and the conventional medium shown in Example 1 was conducted. The medium of this example adopted a three-layered structure consisting of three magnetic layers, i.e., a $[Tb-(Fe_{1-y}Co_y)]_{1-z}Cr_z$ recording layer (y=0.05 and z=0.12; film thickness, 400 Å) sandwiched between two Gd-Fe-Co-Cr read layers (Gd:Fe:Co:Cr=17:61:19:3; film thickness, 300 Å). In addition, a polycarbonate substrate was adopted.

At a rotation of 1800 rpm, the recording operation of the conventional medium required a laser power of 4.9 mW and a bias magnetic field of 200 Oe. However, the recording operation of the medium of this example only required a laser power of 4.1 mW and a bias magnetic field of 200 Oe. Thus, the recording characteristics could be improved.

In the anti-corrosion test using a 1N NaCl aqueous solution, considerable pin holes were visually observed on the conventional medium after it was dipped in the solution for 15 minutes. However, no pin holes could be visually observed on the medium of this example.

In measurement of the exchange-coupling force, the force of the medium of this example tended to be increased to 1.5 times that of the conventional medium.

EXAMPLE 8

Disk-like opto-magnetic memory media having the following compositions and a diameter of 130 mm were prepared by conventional sputtering. A test of recording sensitivity wa conducted. The medium of this example adopted a three-layered structure consisting of three magnetic layers, i.e., a $[Dy-(Fe_{1-y}Co_y)]_{1-z}Al_z$ recording layer (y=0.1 and z=0.1; film thickness, 400 Å) sandwiched between two Gd-Fe-Co-Al read layers (Gd:Fe:Co:Al=16:60:18:6;film thickness, 300 Å).

At a rotation of 1800 rpm, the recording operation could be performed at a laser power of 4.3 mW and a bias magnetic field of 200 Oe. Thus, the recording characteristics could be improved.

In the anti-corrosion test using a 1N NaCl aqueous solution, no pin hole could be visually observed.

EXAMPLE 9

Disk-like opto-magnetic memory media having the following compositions and a diameter of 130 mm were prepared by conventional sputtering. A test of recording sensitivity was conducted. The medium of this example adopted a three-layered structure consisting of three magnetic layers, i.e., a $((Tb_{1-x}Dy_x)-(Fe_{1-y}Co_y))_{1-z}Al_z$ recording layer (x=0.5, y=0.1, and z=0.2; film thickness, 400 Å)sandwiched between two Gd-Fe-Co-Al read layers (Gd:Fe:Co:Al=16:60:18:6; film thickness, 300 Å).

At a rotation of 1800 rpm, the recording operation could be performed at a laser power of 4.4 mW and a bias magnetic field of 200 Oe. Thus, the recording characteristics could be improved.

In the anti-corrosion test using a 1N NaCl aqueous solution, no pin hole could be visually observed.

In addition to the above examples, various other modifications of the present invention may be made. For example, a dielectric protective layer or an optical thin film causing a reflection preventive effect can be provided between the transparent substrate and the second magnetic layer. The present invention includes all these applications.

What I claimed is:

1. An opto-magnetic recording medium comprising:
    a substrate;
    a first magnetic layer formed on said substrate, said first magnetic layer having the following composition:

$[(Tb_{1-x}Dy_x)(Fe_{1-y}Co_y)]_{1-z}M_z$ wherein $0 \leq x \leq 1$, $0 \leq y \leq 0.3$, and $0 \leq z \leq 0.2$, and M is one element selected from the group consisting of Cr or Al; and
    two second magnetic layers respectively formed on the two surfaces of said first magnetic layer, each of said second magnetic layers having a lower coercive force and a higher Curie temperature than those of said first magnetic layer, and being exchange-coupled to said first magnetic layer, and each of said magnetic layers having the following composition:

$(GdFeCo)_{1-w}M_w$ wherein $0 \leq w \leq 0.2$, and M is one element selected from the group consisting of Cr or Al.

2. A medium according to claim 1, wherein said medium further comprises a protective layer formed on said magnetic layers on a side opposite to said substrate.

3. A medium according to claim 1, wherein said medium further comprises a reflection layer formed on one side of said magnetic layers.

4. A medium according to claim 1, wherein the Curie temperature of said first magnetic layer falls within a range of 90° to 120° C.

5. A medium according to claim 1, wherein the film thickness of said first magnetic layer falls within a range of 100 to 600 Å.

6. A medium according to claim 1, wherein the film thickness of said second magnetic layers falls within a range of 100 to 600 Å.

* * * * *

UNITED STATES PATENT AND TRADEMARK OFFICE
CERTIFICATE OF CORRECTION

PATENT NO. : 4,871,614

DATED : October 3, 1989

INVENTOR(S) : TADASHI KOBAYASHI

It is certified that error appears in the above-identified patent and that said Letters Patent is hereby corrected as shown below:

COLUMN 4

Line 6, "600Y" should read --600y--.
Line 7. "600Y" should read --600y--.
Line 19, "s, y, and z" should read --x, y, and z--.
Line 34, "$[Gd_{1-p}(Fe_{1-q}Co_q)_p]_{1-v}M_v$ (5)" should read --$[Gd_{1-p}(Fe_{1-q}Co_q)_p]_{1-v}M_v$ (5)--.

COLUMN 5

Line 19, "Tb-Dy" should read --Tb-Fe--.
Line 26, "n pin holes" should read --no pin holes--.
Line 39, "(Gd:Fe:Co=18:2:20;" should read --(Gd:Fe:Co=18:62:20;--.

COLUMN 7

Line 4, "$(Tb-Fe)_{1-z}Al_z$" should read --$(Tb-Fe)_{1-z}Al_z$--.
Line 25, "$[Tb-(Fe_{1-y}Co_y)]_{1-z}Cr_z$" should read --$[Tb-(Fe_{1-y}Co_y)]_{1-z}Cr_z$--.
Line 52, "wa" should read --was--.

UNITED STATES PATENT AND TRADEMARK OFFICE
CERTIFICATE OF CORRECTION

PATENT NO. : 4,871,614

DATED : October 3, 1989

INVENTOR(S) : TADASHI KOBAYASHI

It is certified that error appears in the above-identified patent and that said Letters Patent is hereby corrected as shown below:

COLUMN 8

Line 26, "claimed" should read --claim--.

Signed and Sealed this

Thirty-first Day of March, 1992

Attest:

HARRY F. MANBECK, JR.

*Attesting Officer*  *Commissioner of Patents and Trademarks*